May 27, 1958  L. G. BOEHNER  2,836,254
COMBINED MOTOR AND AXLE SUSPENSION
Filed July 22, 1954  2 Sheets-Sheet 1

INVENTOR
LUDWIG G. BOEHNER
BY
ATTORNEY

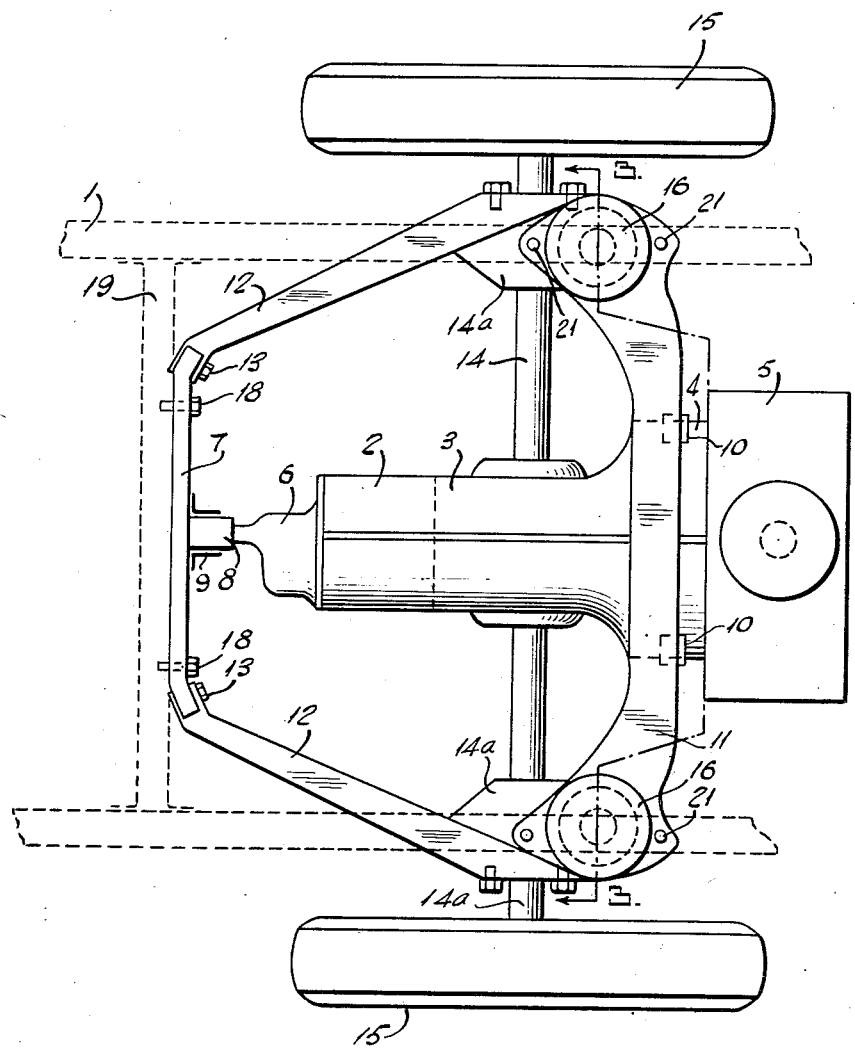

United States Patent Office 2,836,254
Patented May 27, 1958

2,836,254

COMBINED MOTOR AND AXLE SUSPENSION

Ludwig G. Boehner, Braunschweig Querum, Germany

Application July 22, 1954, Serial No. 445,117

3 Claims. (Cl. 180—64)

This present invention relates to motor vehicles, and more particularly to the mounting of the wheels thereof.

It is an object of the present invention to render the driving aggregate of the motor vehicle a closed unit which may be suspended from the body of the motor vehicle with a few manipulations, particularly of screws fastening the driving aggregate on the body.

It is another object of the present invention to simplify the process of the manufacture of motor vehicles.

It is a further object of the present invention to render economical the assembly of the single units.

It is still another object of the present invention to provide a structure of the motor vehicle which is less subject to disturbances than the structure hitherto known in the art, any disturbances having a smaller effect on the expenses for repair.

Figure 1:
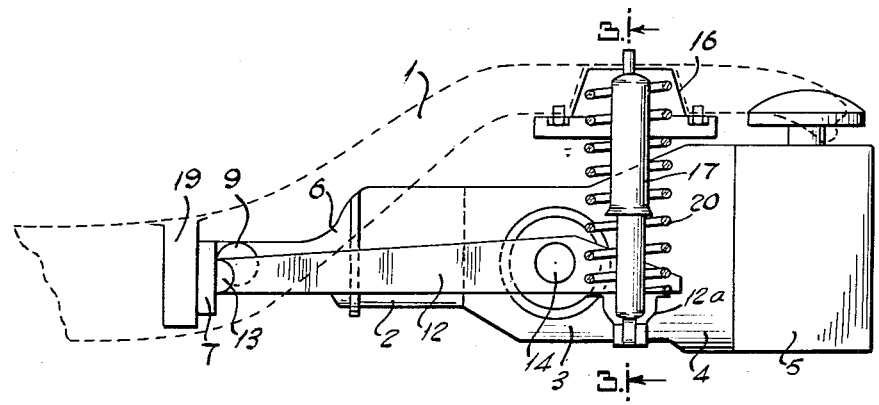
Figure 3:
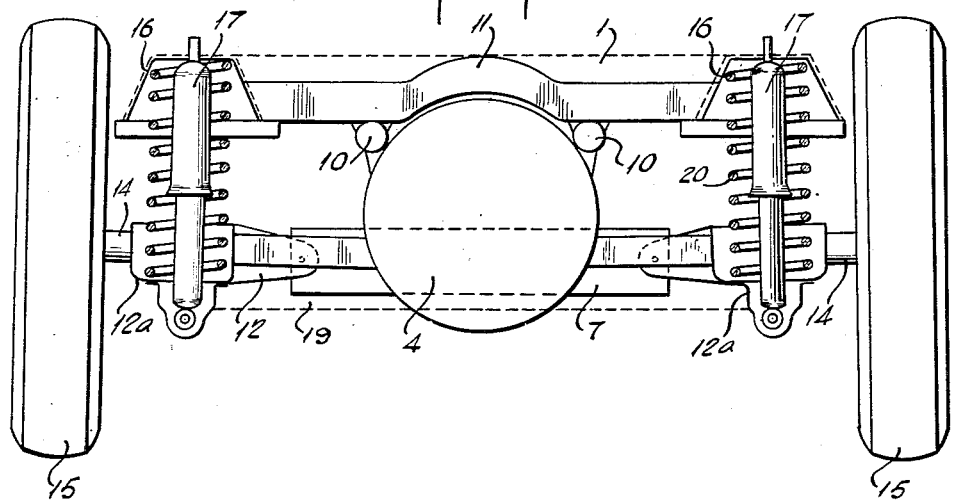

Other objects and advantages of the present invention will become apparent from the following detailed description thereof in connection with the accompanying drawings showing by way of example, a preferred embodiment of the present invention. In the drawings Fig. 1 is an elevation of a motor vehicle according to the present invention, Fig. 2 is a plan view of the motor vehicle shown in Fig. 1, and Fig. 3 is a section along the lines III—III of Fig. 1.

Referring now to the drawings the body 1 of a motor vehicle supports the driving block comprising the change gear 2, the drive 3 of the axles, the clutch 4, and the engine block 5. To this end the driving block is secured with the end 6 thereof, to a transverse or cross member 7 (termed hereinafter the first transverse member) by means of a rubber block 8 secured to a corresponding bearing member 9. The housing of the clutch 4 is suspended by two members 10 consisting of rubber cylinders, from another or second transverse or cross member 11. The transverse member 7 is articulated to guiding members or rods 12 so that the pivotal axis 13 is inclined at the pivotal points or fulcrums at the transverse member 7 to the longitudinal axis of the body. The wheel axles 14 are driven by drive 3. The axle 14, 14 are journaled by bearing members 14a—14a formed on respective guide rods 12, 12 near the free ends of the guiding rods 12, the wheels 15 being secured to the free ends of the wheel axles 14. The guiding rods 12 are extended beyond the axle bearings 14a and form dishes or pots 12a for the reception and the attachment of helical springs 20. The latter abut on the other end against dish or pot shaped members 16 forming part of the transverse member 11. Telescopic shock absorbers 17 arranged within the helical springs 20 serve in the same manner as the helical springs for the connection of the transverse member 11 with the guiding rods.

The transverse member 7 is secured by means of screws 18 to a transverse member 19 of the body or the frame, whereas the transverse member 11 is secured by means of screws 21 to the longitudinal member of the body 1.

In the drawings the driving block is shown as forming part of the rear drive of the vehicle. However, if desired, the same could be designed as part of a front drive, the wheels 15 being steerable in this case. The engine may be arranged at the front side of the driving block or at the rear side thereof.

The driving aggregate including the drive of the axle is arranged as a unit suitable for production line manufacture and connected by means of a few screws with the body or the frame of the motor vehicle. According to the present invention two transverse or cross members are pivoted to the guiding members, one of the transverse member serving as a fulcrum of the guiding members, the other of the transverse members serving as a resilient support of the guiding members on the frame, the transverse members being connected with the main frame or the body by a few connecting means. The resilient support of the guiding members with respect to one of the transverse members is effected behind the guiding members by means of helical springs and/or telescopic shock absorbers.

For an economical manufacture the transverse or cross members and the guiding members are formed as sheet metal parts. Furthermore the driving block, the links and the joints are supported by rubber parts in order to increase the silencing effect and render the device shock proof.

Preferably the telescopic shock absorbers are arranged within the helical springs.

The present invention is by no means limited to the embodiments described hereinabove and it should be understood that other embodiments thereof are to be considered as falling within the scope of the present invention and the claims defining said invention.

I claim:

1. In a motor vehicle, a single unitary suspension system for the combined purpose of vehicle suspension, including a support for the motor aggregate, and transmitting vehicle propelling force from the motor aggregate to the drive wheels and from the drive wheels to the vehicle frame comprising, a vehicle frame, forward and rearward transverse members, means suspending said transverse members from said frame, a motor aggregate suspended from and between said transverse members, a pair of independently propelled road wheels, a pair of road wheel axles, each of which has a wheel mounted at its outer end, said axles having inner ends mechanically connected to said motor aggregate to transmit vehicle propelling force from the latter to said wheels, a pair of substantially longitudinal guide members pivotally suspended at the forward ends thereof to said forward transverse member, bearing members formed on said guide members for journaling respective axles adjacent the rearward ends of said guide members, said rearward ends of said guide members projecting rearwardly and beyond said axle bearing members, means resiliently connecting said rearward ends of said guide members and said rearward transverse member and providing yieldingly resisting action against upward vertical travel of respective wheels in response to road irregularities, whereby the vehicle suspension including support for the motor aggregate provided by said system does not interfere with the transmission of vehicle propelling force.

2. Apparatus as defined in claim 1, wherein said rearward ends of said guide members and said rearward transverse member having pairs of opposed spring seats, and a helical spring extending between respective opposed seats for yieldingly resisting vertical travel of said wheels.

3. Apparatus as defined in claim 1, wherein said rearward ends of said guide members and said rearward transverse member having pairs of opposed spring seats, a helical spring extending between respective opposed seats for yieldingly resisting vertical travel of said wheels, and shock absorbers arranged within said springs for yieldingly resisting vertical travel of said wheels.

References Cited in the file of this patent

UNITED STATES PATENTS

| | | |
|---|---|---|
| 1,398,024 | Jacobs | Nov. 22, 1921 |
| 1,405,763 | Dargert | Feb. 7, 1922 |
| 2,019,139 | Kliesrath | Oct. 29, 1935 |
| 2,199,517 | Best | May 7, 1940 |
| 2,214,948 | Youngren | Sept. 17, 1940 |
| 2,286,609 | Ledwinka | Jan. 16, 1942 |
| 2,305,936 | Tjaarda | Dec. 22, 1942 |
| 2,321,832 | Leighton | June 15, 1943 |
| 2,369,501 | Wagner | Feb. 13, 1945 |

FOREIGN PATENTS

| | | |
|---|---|---|
| 1,025,071 | France | Jan. 21, 1953 |
| 11,726 | Great Britain | 1908 |